(12) United States Patent
Donovan et al.

(10) Patent No.: US 8,206,817 B2
(45) Date of Patent: Jun. 26, 2012

(54) WINDOW AND DOOR FLASHING, ROOFING UNDERLAYMENT, PROTECTION COURSE, ROOT BLOCK AND SOUND CONTROL UNDERLAYMENT MATERIAL PRODUCTS

(75) Inventors: Michael Donovan, Huntley, IL (US); Jason M. Logsdon, Schaumburg, IL (US); Keith Chappell, Cary, IL (US)

(73) Assignee: AMCOL International Corp.

( * ) Notice: Subject to any disclaimer, the term of this patent is extended or adjusted under 35 U.S.C. 154(b) by 446 days.

(21) Appl. No.: 12/481,805

(22) Filed: Jun. 10, 2009

(65) Prior Publication Data
US 2010/0314026 A1 Dec. 16, 2010

(51) Int. Cl.
B32B 25/02 (2006.01)
(52) U.S. Cl. .............. 428/220; 442/37; 442/38; 442/44; 442/58; 442/290; 442/398; 156/71
(58) Field of Classification Search .................. 442/37, 442/38, 44, 58, 290, 398; 156/71; 428/220
See application file for complete search history.

(56) References Cited

U.S. PATENT DOCUMENTS

| | | |
|---|---|---|
| 1,550,968 A | 8/1925 | Klug |
| 3,027,599 A | 4/1962 | Trachta et al. |
| 3,210,301 A | 10/1965 | White |
| 3,267,187 A | 8/1966 | Slosberg et al. |
| 3,547,674 A | 12/1970 | Draper et al. |
| 3,803,792 A | 4/1974 | Fulton |
| 3,844,668 A | 10/1974 | Winters et al. |
| 4,028,288 A | 6/1977 | Turner |
| 4,109,041 A | 8/1978 | Tellman |
| 4,125,578 A | 11/1978 | Sear |
| 4,244,841 A | 1/1981 | Frankland |
| 4,311,628 A | 1/1982 | Abdou-Sabet et al. |
| 4,795,603 A | 1/1989 | Nagayasu |
| 4,851,500 A | 7/1989 | Lalwani et al. |
| 4,970,043 A | 11/1990 | Doan et al. |
| 5,010,122 A | 4/1991 | Koski |
| 5,086,552 A | 2/1992 | Moore |
| 5,157,081 A | 10/1992 | Puydak et al. |
| 5,157,082 A | 10/1992 | Johnson |
| 5,254,405 A | 10/1993 | Panaroni et al. |
| 5,256,228 A | 10/1993 | Davis et al. |
| 5,258,222 A | 11/1993 | Crivelli |
| 5,290,886 A | 3/1994 | Ellul |
| 5,338,783 A | 8/1994 | Olsen |

(Continued)

OTHER PUBLICATIONS

Material Data Sheet—Exxon Exact 3128, date unknown.*

*Primary Examiner* — Elizabeth Cole
(74) *Attorney, Agent, or Firm* — Marshall, Gerstein & Borun LLP

(57) ABSTRACT

A window or door flashing or roofing material, containing no asphalt, either mechanically fastened or self-adhering comprising a mixture of: one or more ethylene based elastomers having a melting point below 160° F., in an amount of 10-40% based on the total weight of the product; one or more semi-crystalline, non-elastomer alpha olefin-based polymers having a melting point above 160° F. in an amount of about 10-40% based on the total weight of the product; and a rubber fraction of ground, vulcanized rubber having a size up to about 18 mesh, US Sieve Series, in an amount of about 10% to about 75%, based on the total weight of the product.

46 Claims, 8 Drawing Sheets

U.S. PATENT DOCUMENTS

| | | |
|---|---|---|
| 5,385,953 A | 1/1995 | McClellan |
| 5,389,715 A | 2/1995 | Davis et al. |
| 5,453,313 A | 9/1995 | Kiser |
| 5,523,328 A | 6/1996 | Rosenbaum et al. |
| 5,525,399 A | 6/1996 | Kiser |
| 5,527,409 A | 6/1996 | Lanphier |
| 5,580,638 A | 12/1996 | Kiser |
| 5,594,073 A | 1/1997 | Crepeau et al. |
| 5,635,551 A | 6/1997 | Lee |
| 5,675,954 A | 10/1997 | Garcia |
| 5,687,517 A * | 11/1997 | Wiercinski et al. ............. 52/177 |
| 6,194,519 B1 | 2/2001 | Blalock et al. |
| 2004/0157075 A1* | 8/2004 | Yang ............................ 428/516 |
| 2006/0046084 A1* | 3/2006 | Yang et al. .................... 428/500 |

\* cited by examiner

WINDOW AND DOOR FLASHING, ROOFING UNDERLAYMENT, PROTECTION COURSE, ROOT BLOCK AND SOUND CONTROL UNDERLAYMENT MATERIAL PRODUCTS

FIELD OF THE INVENTION

The present invention relates to low-cost, efficiently-manufactured, crumb rubber-based (vulcanized rubber-based) window and door flashing, roofing material, protection course, root block for greenroofs and sound control underlayment products. The products are weatherproof, non-absorbent, inexpensive to manufacture, durable, and contain no asphaltic material. The products are installed either by loose lay, mechanically fastening or self-adhering. In such uses, the inventive products will have an average life far greater than that of current commercial roofing and flashing products, which are made using fiberglass or asphalt. The invention also includes a method of making such products. The products of this invention use "crumb rubber" material as the polymer base in combination with one or more polyolefins. The rubber material can be most efficiently provided by the use of crumb rubber particles ground from spent automobile tires and other recycled rubber debris, which are readily available and of very low cost.

BACKGROUND AND PRIOR ART

The market for construction flashing and roofing products, including tab-type strip roofing shingles, window and door flashing and roofing underlayment, is very large. Each year, several million new homes are built in the United States and Canada utilizing roofing shingles, and additional millions of existing homes have their roofing materials replaced.

Commercial roofing products, other than very expensive slate, metal, tile, or cedar wood products used for very high end houses, are today either asphalt or fiberglass based. Asphalt and fiberglass products suffer from the disadvantages of the expense of raw materials, damage from the consequences of the use of highly combustible raw materials in their manufacture, surprisingly quick degradation when exposed to the elements and consequent short useful life, and in the South and Southeast, high levels of actual breakage caused by hail, have occurred.

Commercial waterproofing products today utilize hot-applied rubberized asphalt as a waterproofing membrane and protected roofing membrane. The hot-applied rubberized asphalt is typically produced with recycled content including crumb rubber. These systems require the use of a protection course which is typically modified asphalt reinforced with a scrim typically a fiberglass mat. These products also suffer from similar disadvantages which are the expense of raw materials, their combustible nature, high use temperatures during application, surprisingly quick degradation when exposed to the elements, and damage caused by hail. Typically these systems require the installation of additional ballast for protection. An addition disadvantage is that, at high temperatures, the asphalt portion can flow and creep leading to defects in the waterproofing or staining of the external areas of the structure.

Greenroofs are relatively new in the United States, but have been utilized throughout Europe for decades. One important component in the greenroof assembly is a root barrier to protect the asphaltic waterproofing membrane from damage caused by root penetration. The roots will seek nutrients from an organic-asphaltic waterproofing membrane. Therefore a non-asphaltic membrane must be utilized for the root barrier. Typically the membranes used for root barriers have been polyethylene sheets or PVC membranes. Depending upon the aggressiveness of the roots, the seams of the plastic components may be required to be sealed.

Sound control underlayments utilize a variety of products ranging from fused entangled elements, typically polymeric fibers, to 100% recycled crumb rubber. Due to the formulation, manufacturing process or performance properties, these membranes are typically very thick and costly.

The construction industry has therefore long sought a competitively priced, relatively low-cost, product that could be efficiently manufactured. Scientists and practical construction industry management have long searched for a product that used sustainable, higher quality raw materials than such traditional materials as asphalt and fiberglass.

The search for such new products has, up to now, also unsuccessfully looked at the potential for use of a major American waste product, which itself has not found commercial uses at anything approaching the volumes of waste materials produced. For almost as long as rubber tires have been manufactured, the question of finding an acceptable use for worn-out tires has stimulated invention. References to the history of this development are set forth in U.S. Pat. No. 4,851,500, where patents directed to recycling as old as 1957 are cited, with "related" patents as old as U.S. Pat. No. 1,550,968 (1925). Similarly, the concept of recycling rubber tire material by grinding such material into small pieces is quite old. U.S. Pat. No. 3,210,301 discloses two improvements for reducing the processing time of recycled rubber used for rubber compounding and describes the recycling use in 1965 as already "well known". A 1978 U.S. Pat. No. 4,125,578 describes a heat process for reclaiming vulcanized "crumb rubber" from tires.

The use of large geometrical pieces of tires as roofing is similarly old. U.S. Pat. No. 3,803,792 for a "Tire Roof" discloses the construction of a roof covering made from cut and segmented waste tires, providing in effect a tile roof where the tiles are segments of tires. Work has continued in this unusual area of the use of cut-up tire segments up to the present day, with improvements in the configuration of the tire segments shown in U.S. Pat. Nos. 5,086,552 and 5,675,954 as recently as October, 1997. In none of these patents is any consideration shown of the possibility of the creation of a new roofing product from particles of tires and other materials. Similarly, there is no consideration shown of the utility of small (millimeter-sized) pieces of ground tire material.

The general concept of using small pieces of rubber, such as crumbs from the recycling process, to add desired characteristics to other materials is known. U.S. Pat. No. 4,109,041 (1978), as a representative example, teaches the use of waste rubber particles in making non-slip coatings on construction panels.

Several early patents are directed to the reuse of recycled tire waste to make various types of sheet goods, including roofing sheets. These early patents, and their more modern progeny, use heat and thermosetting agents to create molded articles. For example, U.S. Pat. No. 3,027,599 discloses a method of molding articles from scrap tire material, using a thermosetting binding agent. U.S. Pat. No. 3,267,187 discloses the use of crumb rubber (not specifically from scrap tires) in formed, resin-fused textured sheet flooring. U.S. Pat. No. 3,844,668 generally shows the use of recycled rubber from whole tires, reacted at high temperatures with asphalt, and then dissolved in kerosene or a similar hydrocarbon, to repair pavements or roofing.

Other patents teach the incorporation of utilizing rubber utilize crumb rubber to make rubber sheet goods or similar goods which might be used on roofs. One set of patents demonstrate attempts to obtain useful materials from rubber ingredients by essentially using pressure alone. U.S. Pat. No. 5,527,409 discloses a log-like structure created from pressed crumb rubber which is spirally sliced into sheets (with a separate waterproofing compound to be added after installation)—the patent does not disclose any elastomer or other blending additives and describes the only bonding mechanism as being pressure.

Another group of patents deals with batch-type molding or casting processes for making recycled rubber roofing products involving extensive curing (i.e., polymerization), in contradistinction to a continuous-type extrusion process followed by at most limited curing. U.S. Pat. No. 4,028,288 shows a heat and pressure-molded mixture of ground tires, including the fibrous tire cords, and a synthetic thermoplastic resin. The patent identifies a useful synthetic thermoplastic resin as comprising at least one of the materials polyethylene, styrene, and polypropylene.

U.S. Pat. No. 4,795,603 describes a process of mixing rubber waste and crushed polyethylene or polypropylene wastes together, and heating, pressing, and injecting them so as to mold them. The injection molding composition is described as useful for batch-type molding processes, rather than a continuous extrusion-type process.

U.S. Pat. No. 4,851,500, previously discussed, shows the use of scrap rubber, sulfur and pressure to make a cured rubber product for use as roofing products such as roll roofing, tiles, shakes and slates, and other materials. The patent describes this use as an improvement over prior art because it uses pressure rather than a working and plasticizing action such as in extrusion; it also requires the use of sulfur. Bertolino published European Patent Application 0 401 885 is similar, in that it emphasizes the admixture of waste rubbers, plastics, and fibers, mixed with polyethylene or another thermoplastic, and then heated by an extruder or any other similar system.

U.S. Pat. No. 5,254,405 and its continuation-in-part, U.S. Pat. No. 5,385,953, teach the embedding of crumb rubber in a polyurethane matrix. U.S. Pat. No. 5,258,222 utilizes crumb rubber in a cast, tile-like roofing product which is liquid, and cures after pouring. The patent teaches the requirement of epoxy resin or neoprene to hold the other materials together along with silica and other materials.

Three related patents (U.S. Pat. No. 5,453,313, its continuation U.S. Pat. No. 5,580,638, and its continuation-in-part U.S. Pat. No. 5,525,399) disclose the use of polysulfide together with rubber for structural strength. The continuation patents add fire retardant, ultraviolet protection compounds, and an asphalt matrix. The process which is common to all three patents requires the addition of polysulfide and extensive curing.

U.S. Pat. No. 5,635,551 discloses an improvement in the molding of articles using pulverized recycled tires by specifying a limited range of thermoplastic resins. The patent requires the use of five additional ingredients (starch, acetone, caustic soda, glass wool and ammonium phosphate) with starch, which must comprise at least 5% by weight of the finished composition, having the highest percentage requirement.

A number of alternate technologies for creating materials which gain their strength and hardness from covalent chemical bonds with crumb rubber have also been attempted.

U.S. Pat. No. 4,244,841 utilizes sulfur and zinc stearate as a cure mix to form a rolled product one inch in diameter suitable for roofing, and requires sulfur to achieve its result. U.S. Pat. No. 4,970,043 shows the use of a "cohesive base material" such as a styrene-butadiene block copolymer, and a minimum of "at least" 50% ground rubber. The patent also involves the recycling of exclusively high grade rubber.

U.S. Pat. No. 5,010,122 describes a thermoset composition comprising crumb rubber having a size less than 10 mesh, a thermoplastic material which can include olefinic polymers with blends of similar polymers, and one or more coupling agents. Covalent bonds are formed by reacting a coupling agent to both the crumb rubber and olefin polymers together. The patent describes the requirement of at least one coupling agent, and covalent bonds or equivalent chemical bridges between the rubber particle and the thermoplastic material. The patent specifically identifies silane coupling agents to form the required covalent bonds. The compositions and methods claimed in the instant invention do not contain a coupling agent.

The concept of a polyolefin sheet material for roofing, like that of a rubber material for roofing, is not new: see for example U.S. Pat. No. 5,256,228 ('228) and U.S. Pat. No. 3,547,674 describe the use of asphalt to anchor a polyolefin fabric, with more asphalt anchoring individual crumb rubber pellets attached to the fabric. The '228 patent requires a highly crystalline polyolefin to improve the weldability of the cured EPDM sheet so that overlapping sheet material layers can be heated sufficiently to bond adjacent sheets together. The inventive sheet product described herein does not require curing and is inherently weldable. The polyolefins utilized in the instant invention are homopolymers and have a crystallinity less than 25%, e.g., 2% to 25%.

There are a number of patents which utilize rubber plus an olefinic substance, but generally require specific chemicals appropriate to the particular polymerization reactions being described. See U.S. Pat. No. 4,311,628 which describes a blend of polyolefin resin and particles of EPDM rubber of a size below 50 microns average, cured using phenolic compounds. No phenolic curing agents are included in the compositions of the instant invention. U.S. Pat. No. 5,157,081 teaches a vulcanized rubber in a crystalline polyolefinic resin matrix. Rubbers useful are listed as bromobutyl rubber, chlorbutyl rubber, butyl rubber and mixtures thereof with curing required with a non-peroxide curing system. No curing agents (other than any contained in the vulcanized rubber) are included in the compositions of the instant invention. U.S. Pat. No. 5,290,886 adds low molecular weight ester plasticizers that are not included in the compositions of the instant invention.

U.S. Pat. No. 5,389,715 claims an uncured sheet of a polyolefin polymer roofing product which is made semi-self-sealing by curing in place on a rooftop through the inclusion of a "cure package." U.S. Pat. No. 5,594,073 claims a roofing composition involving blends of two specific rubbers, a narrowly-defined urea composition, sulfur, an accelerator, and a cure activator. No urea compounds, cure accelerator or cure activator are included in the compositions of the instant invention.

A patent which teaches the use of rubber in roof shingles, U.S. Pat. No. 5,338,783, teaches the requirement of silicone rubber, silicon dioxide, and aggregates to make tab shingles. Silicon dioxide is not used in the compositions of the instant invention and the material is manufactured in continuous sheets that are cut to size.

There are a few patents which involve extrusion processes that combine crumb rubber and polyolefins. The first of these is U.S. Pat. No. 5,157,082. The patent shows a product made from 10-90 parts by weight of ground rubber, of a maximum 0.060 inches average size, and also describes about 90 to 10 parts by weight of polyolefin resin and at least 0.5 parts by weight of one or more functionalized olefin polymers per 100 parts by weight of polyolefin resin. A second product and process disclosed require about 90 to 10 parts by weight of one or more functionalized olefin polymers. Such functionalized olefin polymers are described to be a copolymer of at least one olefin and at least one ethylenically unsaturated organic monomer; wherein said organic monomer is selected from the group consisting of unsaturated mono or dicarboxylic acids having from 3 to 20 carbon atoms; acid anhydride, maleamic acid, acid halide, ester and metal salt derivatives of said unsaturated mono or discarboxylic acids; vinyl esters of saturated carboxylic acids, wherein the acid constituent of said saturated carboxylic acid has from 2 to 18 carbon atoms; vinyl alkyl ethers wherein said alkyl constituent has from 1 to 18 carbon atoms; vinyl halides; vinylidene halides; acrylonitrile; methacrylonitrile; and styrene. The extruded compositions useful herein do not contain said functionalized olefin polymers.

U.S. Pat. No. 5,523,328 discloses extrusion products employing crumb rubber and a polyolefin. The patent specifies that ground tire waste must comprise rubber and metal debris to provide 2×4 construction materials. The compositions useful herein do not include metal.

U.S. Pat. No. 6,194,519 requires a crumb rubber having a particle size in the range of 10-30 mesh (up to 0.066 inches). The ground vulcanized rubber useful herein has a maximum particle size of about 0.039 inches, preferably a maximum size of about 0.020 inches.

SUMMARY OF THE INVENTION

One aspect of the articles and methods described herein is to solve or substantially alleviate the problems created by prior art asphalt and fiberglass window and door flashing materials and roofing materials, including the expense of raw materials, relatively quick degradation when exposed to the elements and, in certain regions, high levels of breakage and cracking caused by hail.

Another aspect of the invention is to provide a product that has good dimensional stability and low thermal movement over a wide range of temperature.

Another aspect of the invention is to provide a sheet product that is resistant to tearing over a wide range of temperatures.

Another aspect of the invention is to provide a sheet product that retains it's shape after repeated thermal cycling to reduce the amount of edge curling which may result in fishmouth's or adhesive rupture along the edges of the installed product.

Another aspect of the articles and methods described herein is to provide a product that contains no asphalt that can leach onto adjacent surfaces or sealants potentially staining and damaging the aesthetics of the adjacent surfaces or sealants.

Another aspect of the articles and methods described herein is to provide a product that contains no asphalt thereby making it compatible with most building materials such as flexible (plasticized) polyvinyl chloride (PVC) thermal polyolefins (TPO), and ethylene propylene diene M-class rubber (EPDM) based windows or membranes.

Another aspect of the articles and methods described herein is to provide a product that is weather resistant, and will not degrade as conventional roofing felts when exposed to rain or sun, made with low cost sustainable materials and wherein the product has excellent green strength.

Another aspect of the articles and methods described herein is to provide a product that is easily installed either mechanically fastened using nails or is made to be self-adhering.

Another aspect of the articles and methods described herein is to provide a product that seals around fastener penetrations according to ASTM D1970-09 preventing moisture intrusion by water backed up behind ice dams, or from wind-driven rain.

A further aspect of the articles and methods described herein is to provide a product which can easily be made efficiently very inexpensively, using available commercial materials and largely current extrusion process technology in a continuous, semi-continuous, or batch process with low reusable scrap.

Another aspect of the articles and methods described herein is to provide sheet flashing products designed to be disposed around at least a lower portion of the perimeter of a window or door opening as a window and/or door jam liner for channeling away rain water from the window an/or door opening; or as an air and vapor seal around the perimeter of windows and doors.

Another aspect of the articles and methods described herein is to provide a protection course for hot-applied rubberized asphalt waterproofing as used in plaza decks, split-slab construction, protected membrane roofs, parking decks, and green roofs; providing a protection course with increased puncture resistance; and manufactured with tire crumb similar to that used in hot-applied rubberized asphalt, yielding a complete waterproofing system that is "green".

Another aspect of the articles and methods described herein is to provide a flexible flashing for hot-applied rubberized asphalt waterproofing as used in plaza decks, split-slab construction, protected membrane roofs, parking decks, and green roofs; providing a flexible flashing that resists hardening and cracking with time; providing a flexible flashing that hot-applied rubberized asphalt adheres well.

Another aspect of the articles and methods described herein is to provide a root barrier membrane for greenroofs; that contains no asphalt; provides superior puncture resistance; provides extended protection from the harsh elements and UV exposure allowing the waterproofing system to be installed separately from the balance of the greenroof; providing a complete waterproof system that is "green".

Another aspect of the articles and methods described herein is to provide a sound reducing flooring underlayment that provides sound reduction; provides moisture barrier; and provides superior compression resistance.

Other aspects, as well as advantages, of the articles and methods described herein will become clear from the following detailed description of the preferred embodiments.

DESCRIPTION OF THE PREFERRED EMBODIMENTS

Figure 1:
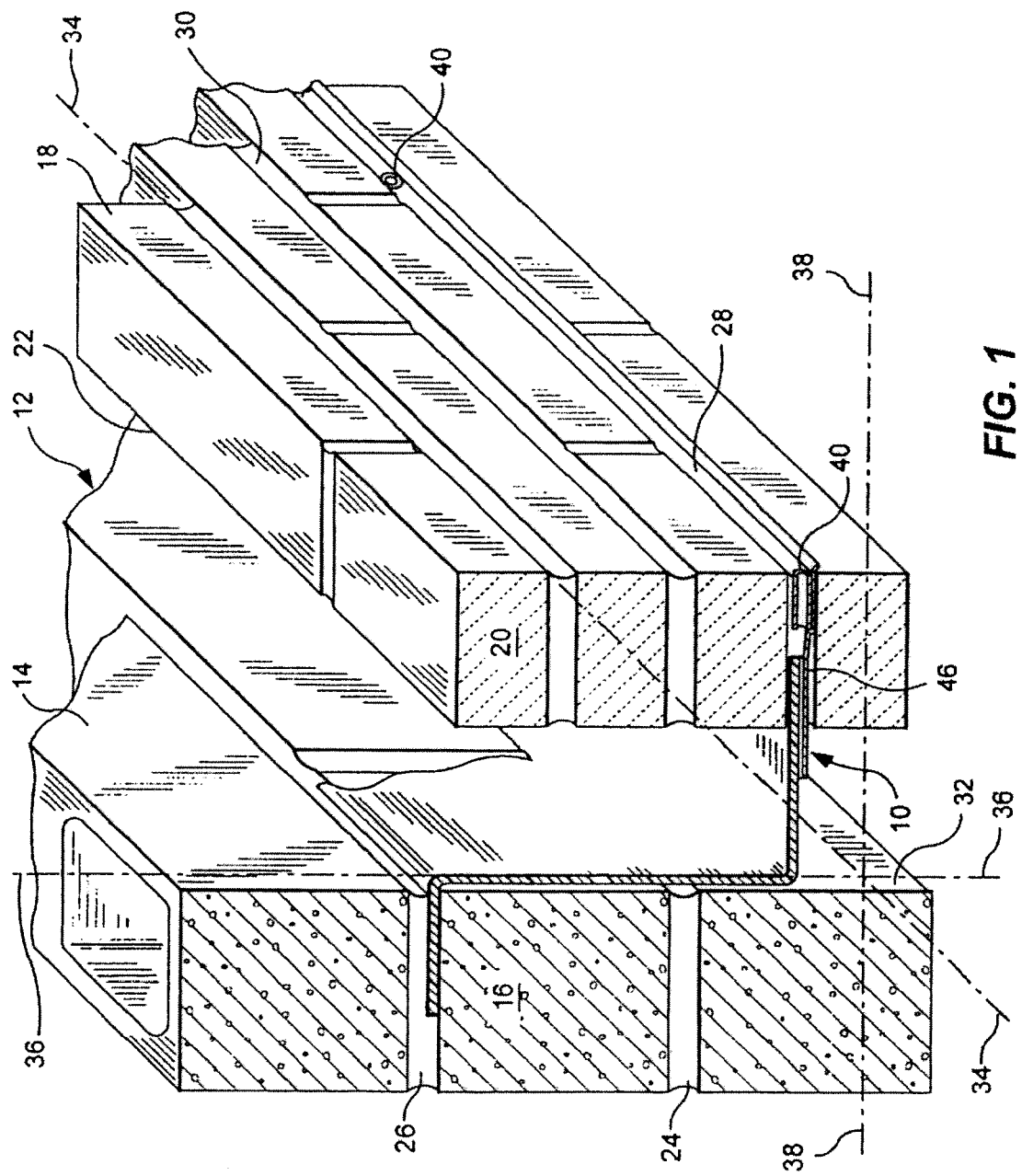
FIG. 1 is a perspective view of a masonry flashing embodiment of the products described herein.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The products of the instant invention are produced by extrusion as a mixture of materials as follows:

A product, including a window or door flashing or roofing material product, which comprises an extruded sheet material containing:

a. one or more polyolefin elastomers having a melting point below about 160° F., preferably below about 125° F.; and b. one or more non-elastomer polyolefins having a melting point above about 268° F., preferably above about 310° F.; and c. a ground, vulcanized rubber fraction, preferably obtained from recycled spent automotive or truck tires, and similar sources of waste vulcanized rubber (sometimes known as "crumb rubber"), ground or recycled into particles having a size up to about 18 mesh, more preferably up to about 35 mesh, U.S. Sieve Series, or up to about 0.039 inches, preferably up to about 0.020 inches; most preferably from about 0.003 inches to about 0.020 inches wherein the rubber fraction comprises up to about 75% by weight of the total product, preferably about 10% to about 65% by weight, more preferably about 35% to about 50% by weight.

d. a woven or nonwoven reinforcing scrim with a melting point higher than about 300° F., preferably above about 490° F.

The sheet product can contain a wide variety of other non-reinforcing filler ingredients, such as carbon black, coal dust, clays, pigments, colorants, flame retardants, char forming additives, electrically conductive fillers, electrically insulative fillers, sound dampening fillers, scavenger fillers, thermally conductive fillers, thermally insulative fillers, antioxidants, light stabilizers, aromatic, napthenic, or paraffinic hydrocarbons as plasticizers, and other non-metallic materials.

The sheet product contains a reinforcing scrim applied to an upper and/or lower major surface of the sheet material to enhance the dimensional stability of the product when exposed to a range of temperatures in use. Also, the scrim imparts tear resistance at elevated temperatures and helps to prevent dimensional changes and wrinkling of the membrane in use. Preferably, the scrim has a melting/softening temperature that is well above, e.g., at least 30° F. above, the melting point of the polyolefins used in the membrane composition. Such nonwoven scrims can be composed of high melting/softening temperature organic polymers such as polyesters, polycarbonate, polyarylates, polyamides, sydiotactic polystyrene, polyetherether ketones, polycarbonates, polytetrafluoroethylene, polyvinylidene fluoride, polysulfones, polyethersulfones, polyetherimides, polyamideimide and polyimides can be used. For the examples included herein, a polyethylene terephthalate-type spun-lace non-woven scrim was used.

The first important element, for producing the products described herein, is one or more polyolefin elastomers, as a homopolymer or copolymer, having a melting point below about 160° F., preferably at or below about 140° F. The useful polyolefin elastomers are based on olefins having one or more double bonds, usually obtained by cracking naphtha or other petroleum fractions at high temperatures (1500° F.-1700° F.). Those olefins containing one double bond are called alkenes, and those with two, alkadienes or diolefins. Alpha olefins or α-olefins are particularly reactive, because the double bond is on the first carbon atom. Preferred polyolefin elastomers (POE) are copolymers having a melting point below 140° F. such as the Engage® elastomers from Dow Chemical or Exact elastomers from Exxon-Mobil. Examples of these resins include Dow ENGAGE® 8842, an ethylene-octene copolymer having a melting point of 92° F. and ExxonMobil Exact 5062 having a melting point of 109° F.

The polyolefin elastomers useful in the compositions that are extruded to form the sheet material flashing and roofing products described herein are polymerized from olefins having the representative formula:

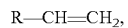

wherein R is an alkyl group having 1 to 12 carbon atoms, straight chain or branched.

The production of polymers from olefin monomers by the use of aluminum halide catalysts and by high-pressure thermal or peroxide-catalyzed polymerization is well known in the prior art. Any method of synthesis of the polyolefin elastomers is suitable for obtaining the polyolefin elastomers described herein.

Particularly useful in formulating the products described herein can be any type of a large family of well-known metallocene catalyzed polyolefin elastomers, such as ethylene-octene, ethylene-butene and ethylene-hexene copolymers, having a melting point below about 140° F., polyethylene and polypropylene copolymers are the most preferred.

Even more preferred are polyolefin elastomers with a narrow molecular weight distribution and low long-chain branching content which are produced through single-site metallocene catalyzed (SSC) polymerization. Examples of these catalyst systems include ExxonMobil's "Exxpol" technology which is used to produce the Exact POE resins and Dow chemical's "Insite" technology which uses a constrained-geometry SSC catalyst system to produce the Engage POE resins. It is claimed that the constrained-geometry SSC catalysts produce polymers with less long-chain branching.

The second (non-elastomeric) polyolefin included in the compositions and methods described herein have a melting point above about 268° F., preferably above 320° F., and preferably having a melt flow index is in the range of 2 dg/min to 25 dg/min as measured at 446° F. and 2.16 Kg. according to ASTM D-1238. The preferred polyolefins are copolymers, particularly polypropylene copolymers, such as an ethylene/propylene copolymer having a density greater than 0.89 and 0.91 g/cc.

The ground, vulcanized rubber or crumb rubber fraction of the products described herein can be broadly defined as any thermoset ethylene-propylene copolymer (also referred to as EPDM or EPT). This fraction is provided by recycled discarded rubber products, and most preferably spent automotive tires.

EPDM products are elastomers based on stereospecific linear terpolymers of ethylene, propylene, and small amounts of a nonconjugated diene, e.g., a cyclic or aliphatic diene (hexadiene, dicyclopentadiene, or ethylidene norbornene). The unsaturated part of the polymer molecule is pendant from the main chain which is completely saturated.

Tires, most particularly their cover strips for sidewalls and tire tubes, are composed primarily of EPDM. Recycled rubber, as defined by the Rubber Recycling Division of the National Association of Recycling Industries, Inc., can be said generally to refer to any and all sorts of rubber waste, including scrap tires, that have been converted into an economically useful form, such as reclaimed rubber, ground rubber, reprocessed rubber and die-cut punched rubber parts. Such discarded rubber waste products may also include pneumatic tires, liners, tubes and any other discarded rubber product or by-product formed from natural rubber, polymers and co-polymers of synthetic rubber, i.e. styrene-butadiene rubber, ethylene-propylene diene rubber, and the like, or blends thereof. Preferably, the recycled rubber to be used in the products described herein are first ground into particulates having a size less than or finer than about 10 mesh (less than about 0.079 inches), and are often called "crumb rubber" by people in the industry, and are so designated for this invention. Rubber particulate having sizes less than about 20 mesh (less than about 0.033 inches) have been found to be quite useful in forming the inventive products described herein.

The recycled rubber particulate may be formed using suitable grinding techniques known in the art. Commercially available ground waste rubber can be used. Any metal within the waste rubber should be removed, either mechanically, magnetically or by other known techniques. After the rubber particulate or crumb has been formed, it, along with the other materials, are fed into a continuous mixing device, such a twin screw extruder.

The inventive polymeric products are easily made and easily used, and are equal to or better than comparable higher-cost products in a wide spectrum of window and door flashing and roofing applications.

It should be noted that the inventive products do not include a "cure package" or the equivalent, but are essentially mixtures of thermoplastic resins and ground rubber particles.

Preferably, the products described herein are used as window and door flashing materials that can be cut to size to line a window or door jaw during window or door installation; or as roofing material, including a wide variety of construction and other products including, for example, underlay materials used as replacements for roofing felts, ice dam barriers or root barriers for green roofs.

The inventive window and door flashing and roofing materials can be applied in the same manner as conventional asphaltic or fiberglass products. They are light weight, providing potential cost savings in the design of structural roof supports, as well as ease of application. They provide outstanding strength and durability, together with excellent temperature stability, weatherability and resiliency.

The manufacturing process has no significant adverse environmental implications, while consuming waste products. The waste products used as components of the product can be classified as either post-consumer or post-industrial recycle as defined in accordance with the US Federal Trade Commission. The preferred product contains relatively larger amounts of consumer recycle as compared to industrial recycle. It is more preferred that the product contains at least 5 percent by weight consumer recycle and/or 10% by weight post-industrial recycle or combinations thereof.

The crumb-rubber used in the product can originate from the griding of post-industrial sources of scrap or waste that was produced in the manufacture of the tires. The crumb-rubber used in the product can also orignate from post-consumer sources such as used passenger car and truck tires. The crumb rubber from tires can originate from tire buffings generated in the retreading process or from grinding whole tires, treads and side walls. Preferably, the crumb rubber originates from whole truck tires since this feedstock has a higher content of rubber in its composition, as described in "INVESTIGATION AND EVALUATION OF GROUND TIRE RUBBER IN HOT MIX ASPHALT" F. Roberts; P. Kandhal; E. Brown; R. Dunning; NCAT Report No. 89-3, August 1989, hereby incorporated by reference.

The thermoplastic components of the product can also come from post-consumer and post-industrial recycle stream streams or a combinations thereof. In this case, post-industrial recycle can also include "off-grade" or "off-spec" thermoplastic resins. Off-spec thermoplastic resins are "virgin" materials that have been identified by a material manufacturer as not meeting certain grade specifications for specific customer applications. The term virgin implies that is has not been melt processed after its initial isolation as a finished product by the resin manufacturer The products described herein are easily manufactured. The components of the formulation can be combined and masticated by mechanical means such as a Banbury Mixer or and extruder or an equivalent device. After passing through the mixing device in the molten form the compounded product is passed through a device to remove the thermal energy introduced from the mastication process. Neither coupling agents nor co-agents are included in the compositions described herein, so that no type of covalent bond is intentionally formed during processing. The temperature during extrusion should be at or slightly (e.g., 4-20° F.) above the melt temperature of the polyolefin used, e.g., 325° F. for polyethylene and 350° F. for polypropylene. Temperatures of 325° F. to 400° F. are particularly preferred. Since no vulcanization occurs during the processing the compound, the sheet product remains a thermoplastic after processing. The sheet product and the scrap produced in the manufacture of the product can be directly recycled through standard melt processing without the intensive grinding steps needed to recycle vulcanized products.

In accordance with a preferred embodiment of manufacturing the flashing and roofing materials described herein, the method includes the steps of intimately mixing the crumb rubber, polyolefin(s) and fillers and then extruding the mixture at a temperature sufficient to melt the polyolefin, e.g., about 320° F. to about 400° F., preferably about 325° F. to about 360° F.

The sheet articles can be made in a one or two step process. In a two step process, the thermoplastic formulations are first compounded using batch or continuous melt mixers and isolated as a pellet or grind. Secondly, the compounded product is converted into a sheet form by melt extrusion or a calendering process. In a one step process, the formulations can be compounded and extruded into sheet form on the same equipment.

Preferably, the laminates are produced in a one step process where the formulation is pre-blended and fed into a 4.5-inch single-screw extruder equipped with a Maddock barrier screw having a L/D ratio of 32:1. The melt temperature is measured to be 380 to 390° F. with melt pressures ranging from 1,200 to 2,400 PSI. The film die employed is preferably 48 inches in width or larger with a die gap between 0.030 inches and of 0.60 inches. The die temperate set-points range from 340-380° F. The molten extrudate is subsequently laminated to the polyester scrim using a nip rolls under pressure to produce the sheet composite material.

In the preferred embodiment, the extruded sheet material composite is calendared to a desired thickness in the range of about 0.030 inches to about 0.6 inches, more preferably about 0.040 inches to about 0.50 inches In one embodiment, one major surface of the sheet composite is coated with a pressure sensitive adhesive, e.g., hot-melt adhesive. "Renco 53-789" (for example—Renco 53-789) is a butyl rubber pressure sensitive adhesive (PSA) obtained from The Reynolds Company, Greenville, S.C. or "6025" obtained from Alpha Systems, Elkhart, Ind.). Prior to use, the PSA is protected with a release paper or release polyolefin film, that is stripped from the product prior to being adhesively secured in place as a water or vapor barrier, e.g., for doors, windows and roofing material. When used as a roofing material, it is preferred to impart a textured outer surface to the sheet materials during calendaring, as a non-slip surface.

Referring now to FIG. 1, a perspective view of one embodiment of the flashing products described herein, shows a masonry flashing material, referred to generally by the reference designator 10. In this embodiment, a cavity wall structure 12 is shown having an inner wythe 14 of masonry blocks 16 and an outer wythe 18 of facing brick 20. Between the inner wythe 14 and the outer wythe 18, a cavity 22 is formed. Successive bed joints 24 and 26 are formed between courses of blocks 16 and the joints are substantially planar and horizontally disposed. Also, successive bed joints 28 and 30 are formed between courses of bricks 20 and the joints are substantially planar and horizontally disposed. Selected bed joint 24 and bed joint 28 are constructed to align, that is to be substantially coplanar, the one with the other.

The exterior surface 32 of the interior wythe 14 contains a horizontal line or x-axis 34 and an intersecting vertical line or y-axis 36. A horizontal line or z-axis 38 also passes through the coordinate origin formed by the intersecting x- and y-axes. The masonry flashing system 10 described herein is constructed to completely seal the cavity, to drain water therefrom and to permit air and water vapor to enter and exit through weep holes 40 that are in communication with the masonry flashing material 10, as described herein.

Across the cavity 22, in this embodiment, a through-the-wall installation of the masonry flashing system is shown. The flashing material 10 described herein includes the masonry flashing material 10 constructed for embedment in bed joint 26, for adherence to surface 32 in an x-y plane, and extends across and into bed joint 28 thereby sealing cavity 22. In this preferred mode, it is seen that the flashing material 10 is installed above and in fluid communication with, a drip plate 46, preferably of stainless steel to improve the communication between the masonry flashing material 10 and weep holes 40.

Figure 2:
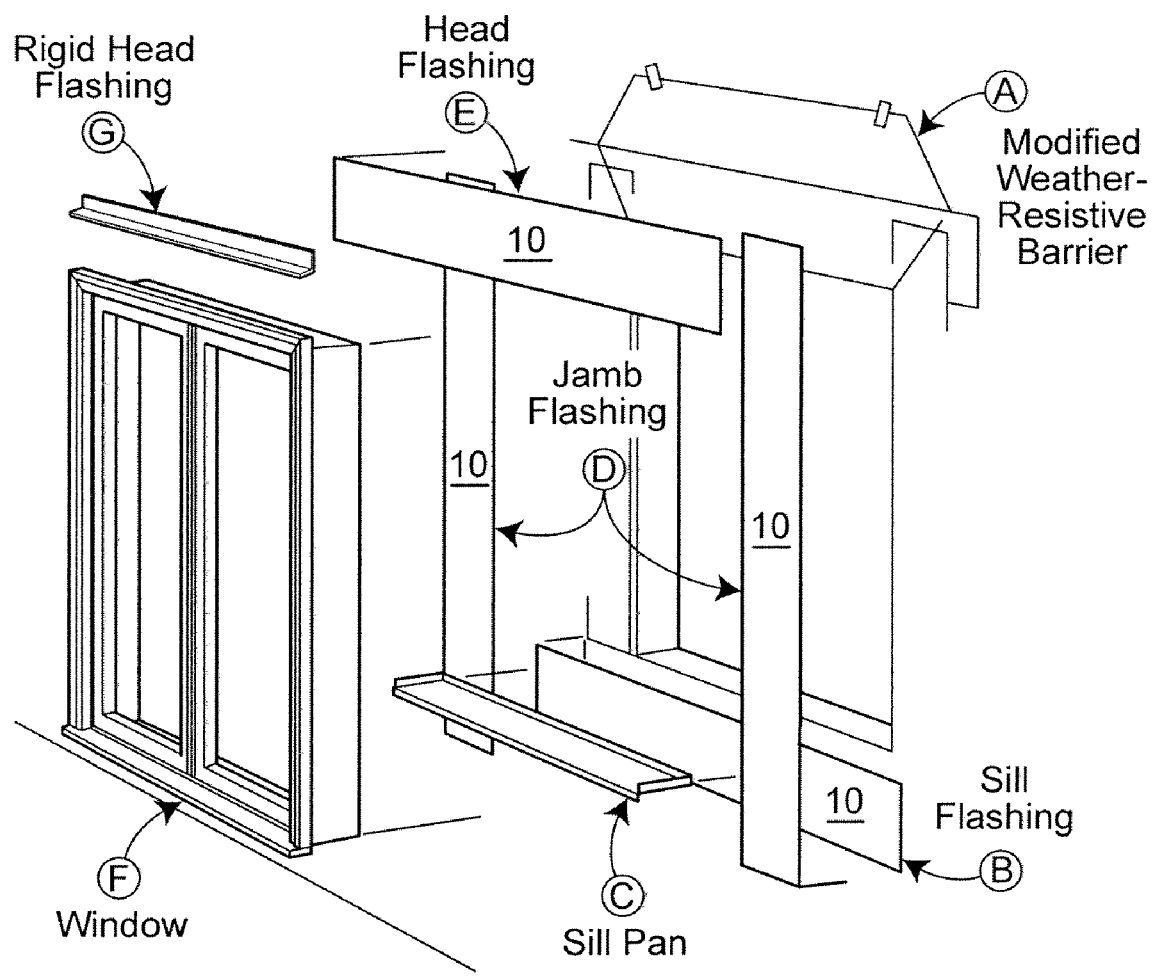
FIG. 2 is a perspective view of the products described herein installed as a window head, jamb, or sill flashing product.
Figure 3:
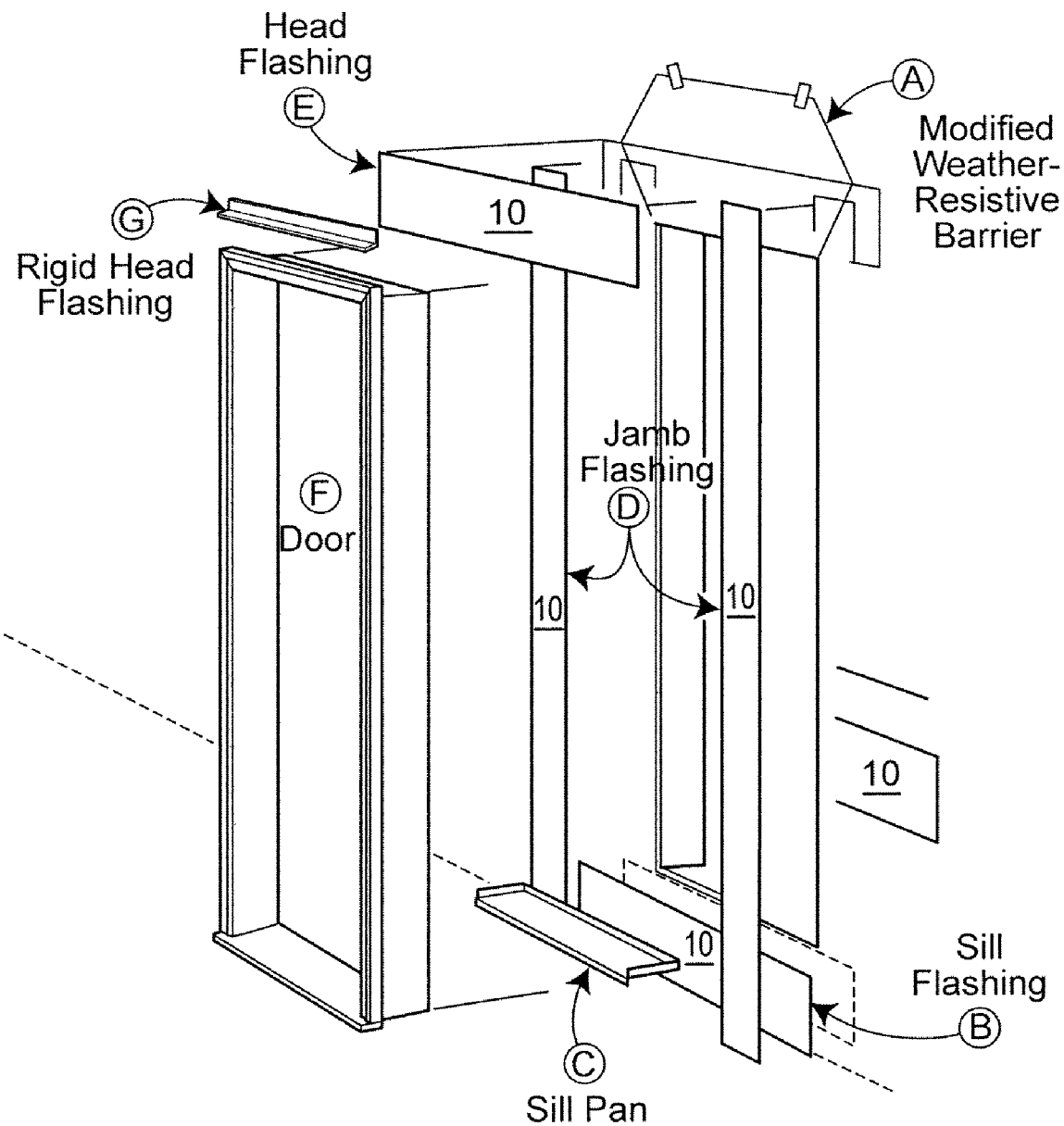
FIG. 3 is a perspective view of the products described herein installed as a door head, jamb, or sill flashing product.
Figure 5:
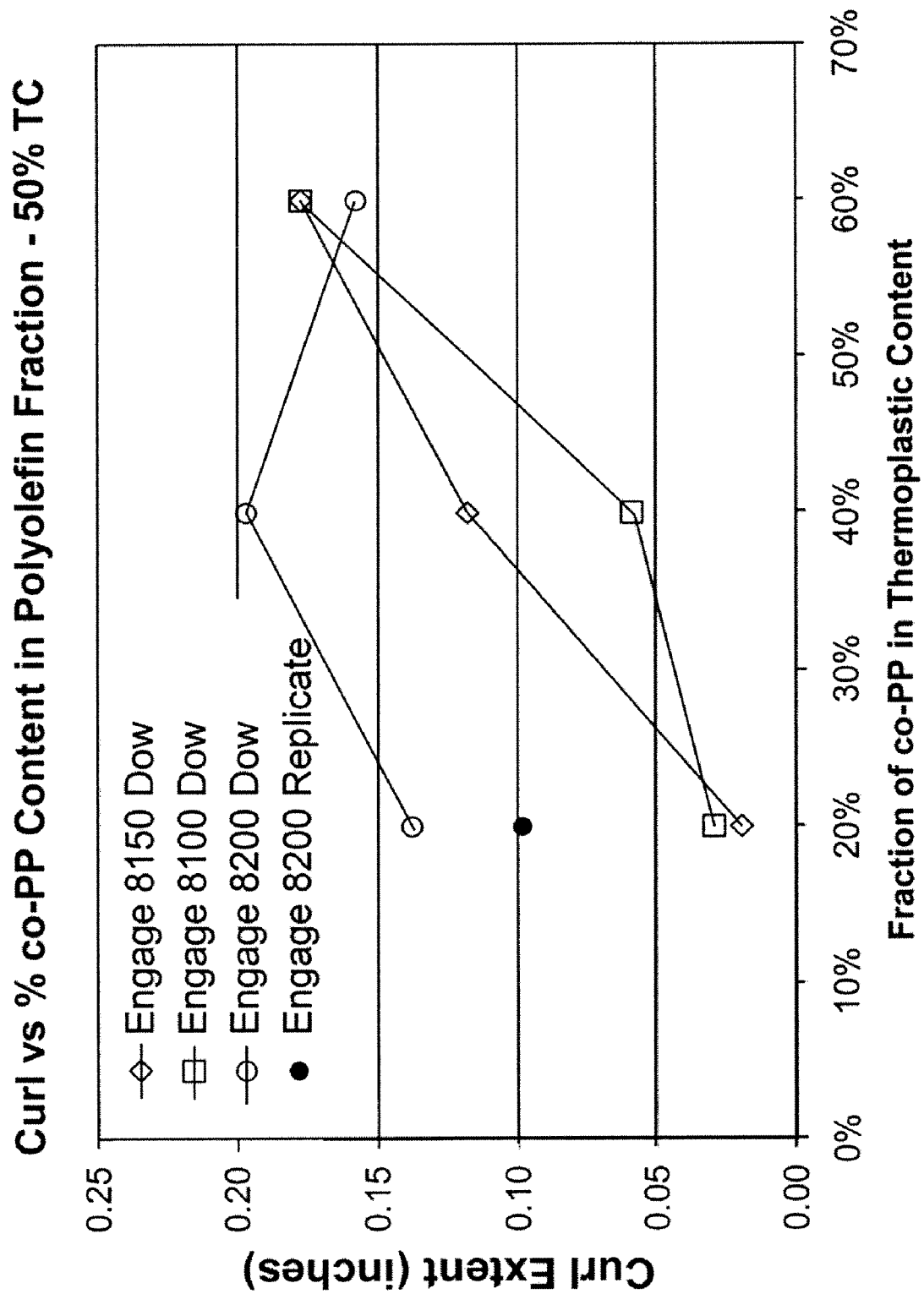
FIG. 5 is a graph showing the effect of polypropylene copolymer percentage on curl extent for various polyolefin elastomers.

As shown in FIGS. 2 and 3, the flashing material 10 is disposed in window installation as window head, jamb, and/or sill flashing (FIG. 2); and as door head, jamb, and/or sill flashing (FIG. 3). As shown in FIG. 2, the flashing material is disposed in window installation as an air and vapor seal around the perimeter of window nailing flange to the exterior sheating or water resistive barrier. As shown in FIG. 5, the sheet material 10 is shown installed as a roofing underlayment material.

EXAMPLES

The present invention is further illustrated by the following examples. The following examples are illustrations designed to assist those skilled in the art to practice the present invention, but are not intended to limit the invention. Changes can be made without departing from the spirit of the invention. The various chemicals used in the examples are commercial materials. The resin formulations for the examples are shown below in Tables 1-4.

Materials. The 30-mesh whole truck-tire crumb-rubber was purchased from North West Rubber Colorado Inc. Ground 20-mesh SBR and 40-mesh EPDM rubbers were obtained from Midwest elastomers Inc. The reinforcing scrim was a PET based, 0.016 inches thick spun-lace non-woven product from Innovative Geotextile with a mass per unit area of 2.6 ounces per square yard. The POE resins were ethylene-octene copolymers supplied by DOW chemical and Exxon-Mobil. The polypropylene homopolymer was supplied by Total. The polypropylene copolymer resin used was a high-impact grade supplied by Basell

TABLE 1

Polyolefin material properties.

| Resin Grade | Resin Type | Melt Flow Rate g/10 min | Specific Gravity sp gr | Melting Point-DSC ° F. |
|---|---|---|---|---|
| Dow Engage 8150 | POE | 0.5$^a$ | 0.868 | 131 |
| Dow Engage 8100 | POE | 1.0$^a$ | 0.87 | 140 |
| Dow Engage 8200 | POE | 5.0$^a$ | 0.87 | 140 |
| Exxon Exact 5371 | POE | 5.0$^a$ | 0.87 | 147 |
| Basell Pro-Fax SB787 | Co-PP | 9.4$^a$/22$^b$ | 0.902 | 333 |
| Total 3270 | PP | 2$^b$ | 0.91 | 329 |

$^a$MFI @ 374° F./2.16 kg-L
$^b$MFI @ 446° F./2.16 kg-L

The composite sheet samples were prepared in a two-step process where the formulations were melted blended and subsequently laminated to the scrim. The resin formulations were mixed in an R.E.E.6 Brabender plasticorder mixing bowl set at 320° F. The polypropylene resins and polyolefin elastomer were combined and mixed for two minutes. When the resins were fully melted, the crumb rubber was added and the formulations were allowed to mix for an additional six minutes. The mixtures were removed from the plasticorder and calendared to a thickness of approximately 0.050 inches using a Reliable 4876 lab mill. The resin samples were cut down to a dimension of 6 inches by 6 inches.

To make the composite sheet samples, a 6-inch-×-6-inch resin sample was laminated to a spun-bonded polyethylene terephthalate nonwoven scrim (thickness=0.016 inches) using a heated Carver press set at 356° F. and a pressure of 56 PSI. The samples were kept between Teflon platen during the lamination process to prevent sticking to the surface of the press. The pressure was increased to obtain the desired thickness, generally about 56 PSI.

To reduce any residual stress in the samples prior to testing, the samples were placed into forced air convection oven at 320° F. for 30 minutes. Prior to loading in the oven the composite sheets were cut into 1-inch-×-4-inch strips, placed between two metal sheets and covered with a 10 lb. weight. The samples were removed and quenched by immersion in room temperature water.

To test for curl, the 1-inch by 4-inch samples were affixed to a plywood substrate using a mechanical fastener, such as a staple, in the middle of the sample. To test for curling, the specimens were aged in a forced air convection oven using a ramped profile to mimic temperature exposure outdoors. The temperature ramp consisted of 74° F. for 30 minutes, 106° F. for 30 minutes, 180° F. for 4 hours, 106° F. for 30 minutes, then 74° C. for 30 minutes. The extent of curl was measured after exposure by the height sample ends curled away from the plywood substrate.

Figure 4:
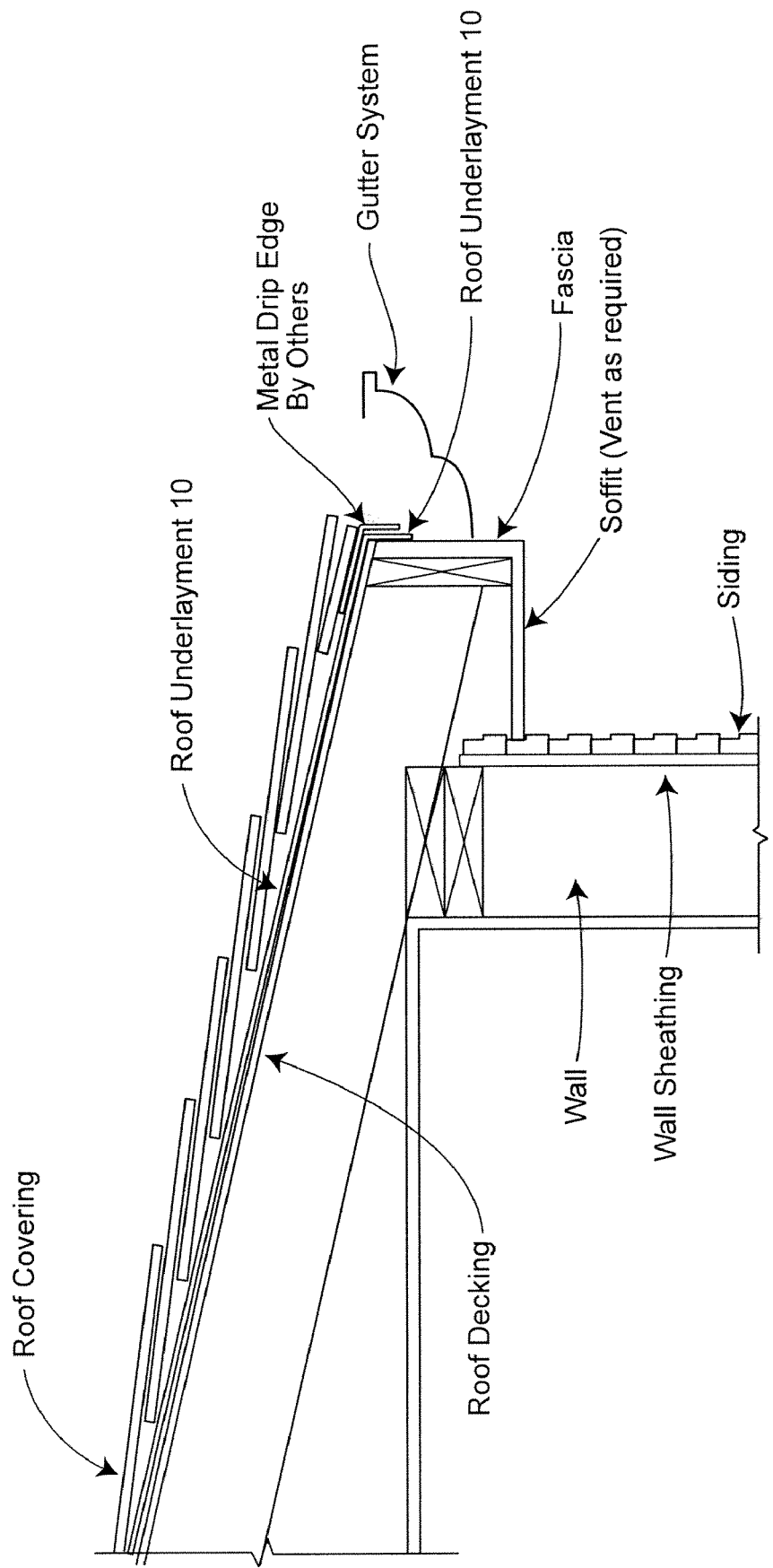
FIG. 4 is a perspective view of the products described herein installed as a roofing underlayment product.

The formulations for examples 1-19 given below in Table 2. For these examples, the tire crumb content was held content at 50%. The thickness of the samples ranged between 0.067 inches and 0.091 inches. The comparative examples 1-12 were used to show the effects of co-PP content on the curl extent using various grades of Engage POE resins. The trends of curl vs. polypropylene content are plotted in FIG. 4. The elastomers chosen for examples 1-12 had similar physical properties such as specific gravity and melting point but differed in melt viscosity. For FIG. 4, it can be seen that the membranes made from the lower melt index elastomers such as the 8150 and 8100 resulted in unexpectedly lower curl values as compared to Engage 8200. For the 8150 and 8100 elastomers, the lowest curl values were achieved at lowest co-PP contents. In the example of Engage 8200, the curl values were higher and almost independent of polypropylene content.

TABLE 2

Curl results for examples 1-19 with ground tire-crumb rubber.

| Example # | Engage 8150 | Engage 8100 | Engage 8200 | Exact 5371 | Co-PP SB 787 | PP 3270 | 30 Mesh Tire Crumb | Curl inches |
|---|---|---|---|---|---|---|---|---|
| 1 | 40% | | | | 10% | | 50% | 0.02 |
| 2 | 30% | | | | 20% | | 50% | 0.12 |
| 3 | 20% | | | | 30% | | 50% | 0.18 |
| 4 | | 40% | | | 10% | | 50% | 0.03 |
| 5 | | 30% | | | 20% | | 50% | 0.06 |
| 6 | | 20% | | | 30% | | 50% | 0.18 |
| 7 | | | 40% | | 10% | | 50% | 0.14 |
| 8 | | | 30% | | 20% | | 50% | 0.20 |
| 9 | | | 20% | | 30% | | 50% | 0.16 |
| 10 | | | | 40% | 10% | | 50% | 0.01 |
| 11 | | | | 30% | 20% | | 50% | 0.14 |
| 12 | | | | 20% | 30% | | 50% | 0.16 |
| 13 | | | 40% | | 10% | | 50% | 0.10 |
| 14 | | | 32% | | 8% | | 60% | 0.00 |
| 15 | | | 24% | | 6% | | 70% | 0.10 |
| 16 | | | 16% | | 4% | | 80% | 0.06 |
| 17 | | | 40% | | | 10% | 50% | 0.16 |
| 18 | | | 30% | | | 20% | 50% | 0.14 |
| 19 | | | 20% | | | 30% | 50% | 0.14 |

Figure 6:
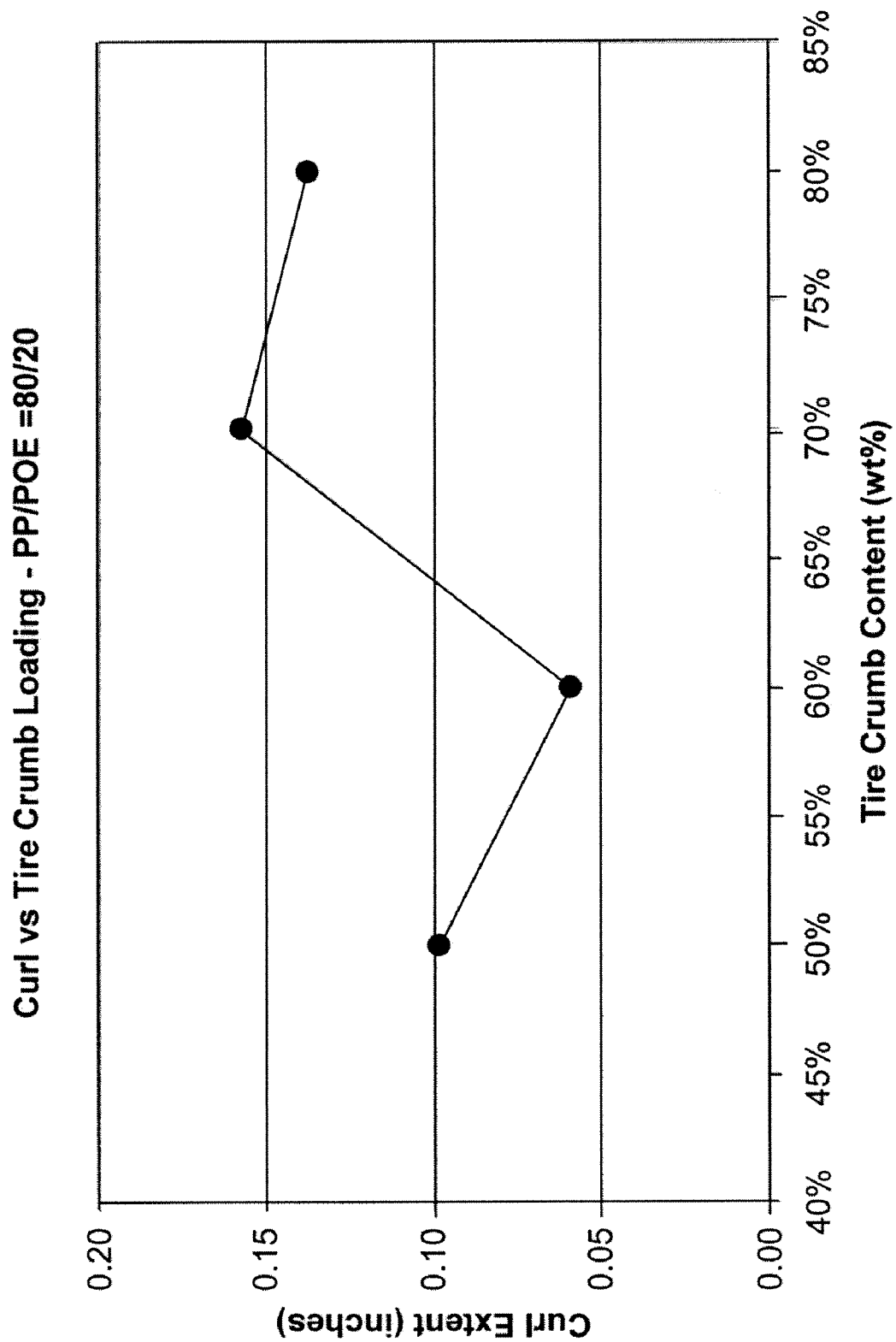
FIG. 6 is a graph showing the effect of tire crumb rubber content on curl extent for an 80/20 weight ratio of Engage 8200/Pro-Fax SB787.

Examples 13-16 illustrate the influence of tire crumb content on the extent of curl using the Engage 8200 elastomer (see FIG. 5). The ratio of PP to Engage 8200 was held constant at 20/80. These examples and FIG. 6 show that tire crumb contents between 50-65 wt %, especially at about 50 wt % crumb content, resulted in lower curl values as compared to higher loadings.

Figure 7:
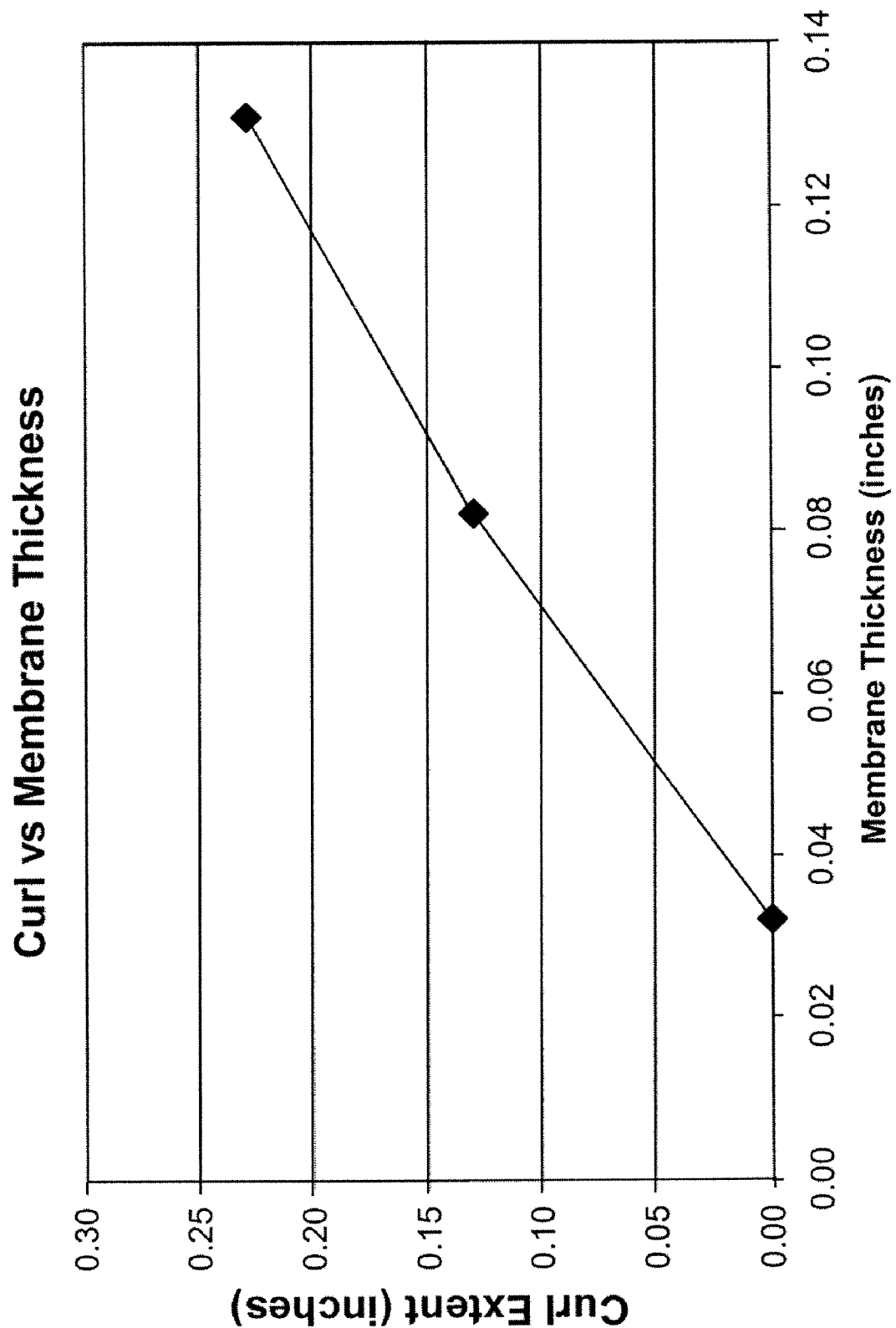
FIG. 7 is a graph showing the effect of membrane thickness on the extent of curl.

The influence of membrane thickness on curl extent was examined. Example #7 was produced at thickness ranging from 0.03 inches to 0.13 inches (Examples 20-22 in Table 3). FIG. 7 shows that there appears to be a fairly linear relationship between thickness and curl where lower curl is observed for thinner composite sheet samples.

TABLE 3

Influence of membrane thickness on curl extent.

| Example # | Engage 8200 | Co-PP SB 787 | 30 Mesh Tire Crumb | Thickness (inches) | Curl inches |
|---|---|---|---|---|---|
| 20 | 40% | 10% | 50% | 0.03 | 0.00 |
| 21 | 40% | 10% | 50% | 0.08 | 0.13 |
| 22 | 40% | 10% | 50% | 0.13 | 0.23 |

Figure 8:
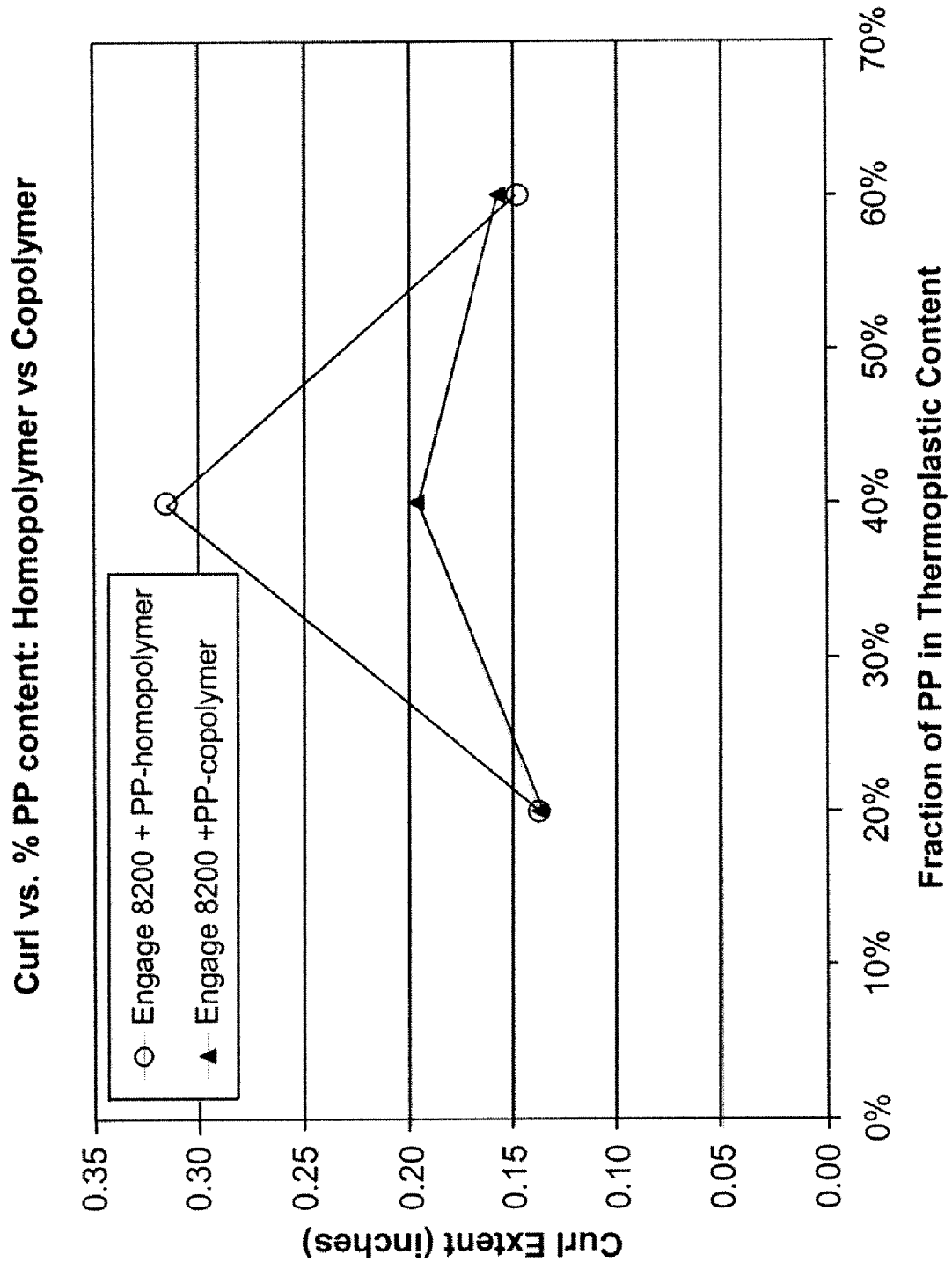
FIG. 8 is a graph showing the curl extent, comparing blends with polypropylene homopolymer or polypropylene copolymer.

Examples 13-16 were compared to samples 17-19 to illustrate the influence of the type of PP on the extent of curl. Examples 17-19 were formulated with a low melt index PP homopolymer. The PP-homopolymer/Engage 8200 ratio was varied from 20/80 to 60/40 and the curl results are plotted in FIG. 8. These examples illustrate that the melt index of the PP component did not affect the extent of curl to a large degree. Only samples with an intermediate PP-homopolymer content showed higher curl values.

Table 4 shows the influence of the various types of rubbers at 50% loading on the extent of curl. Both examples contained the Engage 8200 and co-PP at a ratio of 80/20. Ground EPDM rubber (Example 23) demonstrates similar performance as compared with the ground tire crumb (Example 22). Unexpectedly, ground SBR rubber (Example 24) demonstrated much lower extent of curl.

TABLE 4

Curl results for examples 35 and 36 with ground recycled EPDM and SBR rubbers.

| Example # | 40 Mesh SBR | 20 Mesh EPDM | Engage 8200 | PP Copolymer SB 787 | Curl |
|---|---|---|---|---|---|
| 23 | | 50% | 40% | 10% | 2.5 |
| 24 | 50% | | 40% | 10% | 0 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A dimensionally-stable polyolefin based sheet product comprising a combination of a), b) and c), as follows:
 a) one or more semi-crystalline, ethylene-based elastomeric resins having a melting point below about 160° F.;
 b) a semi-crystalline, non-elastomeric alpha-olefin-based resin with a melting point greater than 268° F.; and
 c) a ground, vulcanized rubber fraction, obtained from recycled rubber, ground or recycled into particles having a size up to about 18 mesh homogenously mixed together and formed into a sheet material having upper and lower major surfaces;
 wherein the amounts are as follows:
 a) an amount greater than 60% by weight based on the total weight of a) and b);
 b) an amount of 4 wt. % to 30 wt. %, based on the total weight of a), b), and c); and
 c) an amount of 50 wt. % to 80 wt. % based on the weight of the total amount of components a), b), and c); and
 d) a woven or nonwoven reinforcing scrim with a melting point higher than about 300° F. adhered to an upper and/or lower major surface of said sheet material.

2. The sheet product of claim 1 wherein the ethylene-based elastomeric resin is a metallocene catalyzed copolymer having the chemical formula:

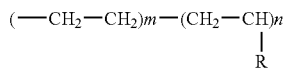

wherein R is an alkyl group, straight chain or branched, having from 5 to about 20 carbon atoms extending from one or more of the n units, and wherein the sum of the m+n units is between 4 and about 400.

3. The sheet product of claim 1, wherein the ethylene-based elastomeric resin has a melt flow index is in the range of 0.1 dg/min to 5 dg/min as measured at 374° F. and 2.16 Kg, according to ASTM D-1238, and wherein the amount of b) is less than 40% by weight, based on the weight of b) plus c).

4. The sheet product of claim 2, wherein the metallocene catalyzed elastomeric resin is an ethylene-octene copolymer having a density less than about 0.9 g/cc in an amount greater than 60% by weight of elastomeric plus the non-elastomeric resins of claim 1.

5. The sheet product of claim 2, wherein the metallocene catalyzed elastomeric resin is an ethylene-butene copolymer having a density less than about 0.885 g/cc in an amount greater than 60% by weight of the elastomeric plus the non-elastomeric resins.

6. The sheet product of claim 2, wherein the metallocene catalyzed elastomeric resin is an ethylene-hexene copolymer having a density less than about 0.883 g/cc in an amount greater than 60% by weight of the elastomeric plus the non-elastomeric resins.

7. The sheet product of claim 3, wherein the ground vulcanized rubber fraction is 50-65 wt. % based on the total weight of a) plus b), plus c).

8. The sheet product of claim 3, wherein the elastomeric resin is post-consumer recycle material.

9. The sheet product of claim 3, wherein the elastomeric resin is post-industrial recycle material.

10. The sheet product of claim 1 wherein the semi-crystalline alpha-olefin-based resin is a polypropylene homopolymer or a polypropylene copolymer having a density between 0.89 and 0.91 g/cc.

11. The sheet product of claim 1, wherein the semi-crystalline alpha-olefin-based resin has a melt flow index is in the range of 2 dg/min to 25 dg/min as measured at 446° F. and 2.16 Kg, according to ASTM D-1238.

12. The sheet product of claim 1, wherein, the ethylene-based elastomeric resin is contained in the sheet material in an amount less than 40% by weight, based on the total weight of b) and c).

13. The sheet product of claim 11, wherein the ethylene-based elastomeric resin is post-consumer recycle material.

14. The sheet product of claim 11, wherein the ethylene-based elastomeric is post-industrial recycle material.

15. The sheet product of claim 11, wherein the semi-crystalline alpha-olefin-based resin has a melting point above 320° F. that is contained in the sheet product in an amount of about 40% or less by weight of the elastomeric plus the non-elastomeric resins of claim 1.

16. The sheet product of claim 1, wherein the reinforcing scrim has a melting point of at least 380° F.

17. The sheet product of claim 1 having a total thickness from about 0.025 inches to about 0.5 inches.

18. The sheet product of claim 1 further including a secondary elastomeric resin selected from the group consisting of attactic polypropylene; ethylene-propylene copolymer; ethylene-co-vinyl acetate; a terpolymer of ethylene, propylene, and a nonconjugated diene; a mixed polymer of ethylene and vinyl acetate; a mixed polymer of ethylene and methacrylate; a thermoplastic urethane; a thermoplastic vulcanizate; a thermoplastic polyester; a styrene-butadiene mixed polymer; chlorinated polyethylene; nitrile rubber (NBR); and a combination thereof in an amount less than 15% of the total weight of the ethylene-based elastomeric resin plus the non-elastomeric resin.

19. The sheet product of claim 1 further including an adhesive coating.

20. The sheet product of claim 19 wherein the adhesive is applied to the major surface of the sheet material and is protected with a contacting release sheet.

21. The sheet product of claim 1, further including an infrared coating or a heat reflective coating.

22. The sheet product of claim 1, further including a visible light reflective coating.

23. The sheet product of claim 1, further including a flame retardant coating.

24. The sheet product of claim 1, further including a coating of a slip-resistant material.

25. The sheet product of claim 1 further including an organic or inorganic filler selected from the group consisting of calcium carbonate, talc dust, wood dust, mica, glass, and a combination thereof in an amount of about 5% to about 60% based on the total weight of the sheet product.

26. The sheet product of claim 1, wherein the ground rubber fraction is selected from the group consisting of EPDM; cryogenically ground EPDM; butyl; neoprene; and combinations thereof.

27. The sheet product of claim 26, wherein the ground, vulcanized rubber has a size less than about 0.040 inches.

28. The sheet product of claim 27, wherein the vulcanized rubber has a size from about 0.003 inches to about 0.020 inches.

29. The sheet product of claim 1 wherein the ground, vulcanized rubber is crumb rubber obtained from tires.

30. The sheet product of claim 29 wherein the crumb rubber is obtained from tire treads that are free of metal.

31. The sheet product of claim 1 further including a plasticizer.

32. The sheet product of claim 31, wherein the plasticizer is a processing oil selected from the group consisting of paraffinic processing oil; paraffinic processing oil and stearic acid; aromatic processing oil; naphthenic processing oil; and a combination thereof.

33. The sheet product of claim 31, wherein the plasticizer is included in an amount from about 1% to about 15% by total weight of the sheet product.

34. The sheet product of claim 1, wherein the reinforcing scrim is a woven or nonwoven textile having a weight of about 0.3 oz/yd$^2$ to about 8 oz/yd$^2$ at a thickness of about 0.003 to 0.026 inches.

35. The sheet product of claim 34, wherein the textile is a spun bond nonwoven textile containing a thermoplastic selected from the group consisting of a polyester; a polyamide; a polycarbonate; a polyphenylenesulfide; a polyarylether; an ultrahigh molecular weight polyethylene; a syndiotactic polystyrene; polyvinylidene fluoride; polytetrafluoroethylene; and a combination thereof.

36. The sheet product of claim 34 wherein the nonwoven textile is a spun bond polyester with a melting point greater than 490° F.

37. The sheet product of claim 34, wherein, the nonwoven textile includes fibers that have a melting point of 300° F. and higher.

38. The sheet product of claim 1, wherein the sheet product is textured on an outer surface to provide a non-slip surface.

39. The sheet product of claim 1, wherein the product has been subjected to a thermal annealing process.

40. A method of waterproofing a building roof comprising applying the sheet product of claim 1 onto the building roof.

41. The method of claim 40, wherein the sheet product is applied to the roof as a material selected from the group consisting of a roofing base sheet; a roofing ply sheet; a roofing underlayment; and a combination thereof.

42. A method of waterproofing a tunnel comprising disposing the sheet product of claim 1 between a water source and an interior of the tunnel.

43. A method of waterproofing a window or door periphery comprising disposing the sheet product of claim 1 between the window or door and a framing member adjacent to the window or door.

44. A method of lining a pond or landfill comprising disposing the sheet product of claim 1 onto a floor of the pond or landfill.

45. A method of constructing a building comprising disposing the sheet material of claim 1 onto the building floor.

46. The sheet product of claim 1 that is physically attached to another layer of sheet material.

* * * * *